United States Patent
Lei et al.

(10) Patent No.: US 10,664,164 B2
(45) Date of Patent: May 26, 2020

(54) HARD DISK SYSTEM OPERATION METHOD, STORAGE SYSTEM, AND PROCESSOR

(71) Applicant: Huawei Technologies Co., Ltd., Shenzhen (CN)

(72) Inventors: Xiaosong Lei, Shenzhen (CN); Yuan Yuan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/736,058

(22) Filed: Jun. 10, 2015

(65) Prior Publication Data
US 2015/0277774 A1 Oct. 1, 2015

Related U.S. Application Data

(63) Continuation of application No. PCT/CN2012/086452, filed on Dec. 12, 2012.

(51) Int. Cl.
*G06F 3/06* (2006.01)
*G06F 8/654* (2018.01)
*G06F 9/4401* (2018.01)

(52) U.S. Cl.
CPC .......... *G06F 3/0607* (2013.01); *G06F 3/0632* (2013.01); *G06F 3/0674* (2013.01);
(Continued)

(58) Field of Classification Search
CPC .................................................. G06F 3/0607
See application file for complete search history.

(56) References Cited

U.S. PATENT DOCUMENTS 7,191,327 B2 3/2007 Viljoen et al.
7,207,039 B2 * 4/2007 Komarla ............... G06F 9/4416
713/2
(Continued)

FOREIGN PATENT DOCUMENTS

CN 101442548 A 5/2009
JP 2004062663 A 2/2004
(Continued)

OTHER PUBLICATIONS

Rubtsov, A. (May 2009). HDD from Inside: Main Parts. Retrieved Aug. 11, 2017, from http://hddscan.com/doc/HDD_from_inside.html. Archived on Jul. 10, 2009 at http://web.archive.org/web/20090710013004/http://hddscan.com/doc/HDD_from_inside.html.*

(Continued)

*Primary Examiner* — Nitin C Patel
*Assistant Examiner* — Joshua Neveln
(74) *Attorney, Agent, or Firm* — Leydig, Voit & Mayer, Ltd.

(57) ABSTRACT

The present invention is applicable to the field of hard disk processing technologies, and provides a hard disk system operation method, a storage system, and a processor. The method includes: starting, by a processor, a Boot Loader recorded in a non-volatile storage medium, configuring an IP address for the storage system after the loader is started, and then establishing, based on the IP address, an IP transmission channel between an external interface and a server; obtaining, by the processor, hard disk firmware from the external interface, where the hard disk firmware is received by the external interface from the server through the IP transmission channel; and suspending, by the processor, a hard disk, and loading the hard disk firmware to a memory.

14 Claims, 3 Drawing Sheets

(52) U.S. Cl.
CPC ............ *G06F 8/654* (2018.02); *G06F 9/4401* (2013.01); *G06F 9/4406* (2013.01)

(56) References Cited

U.S. PATENT DOCUMENTS

| | | | | |
|---|---|---|---|---|
| 8,219,794 | B1* | 7/2012 | Wang | .................... G06F 3/0607 |
| | | | | 713/2 |
| 2002/0194582 | A1 | 12/2002 | Torii et al. | |
| 2004/0022096 | A1 | 2/2004 | Aoki et al. | |
| 2005/0120343 | A1* | 6/2005 | Tai | ............................ G06F 8/60 |
| | | | | 717/173 |
| 2005/0160257 | A1* | 7/2005 | Kruger | ...................... G06F 8/64 |
| | | | | 713/2 |
| 2006/0015861 | A1 | 1/2006 | Takata et al. | |
| 2006/0174049 | A1* | 8/2006 | Lin | ....................... G06F 3/0607 |
| | | | | 710/308 |
| 2008/0141235 | A1* | 6/2008 | Woodbury | ................ G06F 8/60 |
| | | | | 717/168 |
| 2009/0077634 | A1* | 3/2009 | Hung | ........................ G06F 8/65 |
| | | | | 717/173 |
| 2011/0197185 | A1* | 8/2011 | Hobbet | ..................... G06F 8/65 |
| | | | | 713/2 |

FOREIGN PATENT DOCUMENTS

| | | |
|---|---|---|
| JP | 2006031312 A | 2/2006 |
| JP | 2012090265 A | 5/2012 |
| WO | WO 2007109262 A2 | 9/2007 |

OTHER PUBLICATIONS

Gantz et al., "The Digital Universe Decade—Are You Ready?," IDC—IVIEW, EMC Corporation, Hopkinton, Massachusetts (2010).

Yokota, "Creation of Original Boot Loader for Embedded System Development Evaluation Kit," Interface, vol. 34, Issue 1, pp. 84-94, CQ Publishing Co., Ltd. (Jan. 1, 2008).

Hosokawa, "Construction of NAS by FreeNAS," Software Design, Issue 193, pp. 88-99, Gijutsu-Hyohron Co., Ltd. (Nov. 18, 2006).

* cited by examiner

HARD DISK SYSTEM OPERATION METHOD, STORAGE SYSTEM, AND PROCESSOR

CROSS-REFERENCE TO RELATED APPLICATION

This application is a continuation of International Patent Application No. PCT/CN2012/086452, filed on Dec. 12, 2012, which is hereby incorporated by reference in its entirety.

TECHNICAL FIELD

The present invention relates to the field of hard disk processing technologies, and in particular, to a hard disk system operation method, a storage system, and a processor.

BACKGROUND

Generally, firmware (Firmware) functions of a serial attached Small Computer System Interface (Serial Attached SCSI, SAS) hard disk and a Serial Advanced Technology Attachment (Serial Advanced Technology Attachment, SATA) hard disk in the prior art are already fixed before the hard disks leave a factory. However, in an actual application, it is possible that, as the used surrounding software and hardware environments change or are updated, the hard disks may become incompatible with much new hardware and software. It is very necessary to update or upgrade Firmware files of the hard disks in a timely manner to enhance their compatibility.

SUMMARY

Embodiments of the present invention provide a method for implementing an intelligent hard disk, to achieve a timely and dynamic update or upgrade of hard disk firmware.

A first aspect provides a hard disk system operation method, which is applied to a storage system, where the storage system includes an external interface, a processor, a non-volatile storage medium, a hard disk controller, and a hard disk, where the external interface is configured to receive a control signal and service data that are outside the storage system, the processor is configured to obtain the service data from the external interface and control the hard disk controller to store the service data into the hard disk, and the method includes:

starting, by the processor, a Boot Loader recorded in the non-volatile storage medium, configuring an IP address for the storage system after the loader is started, and then establishing, based on the IP address, an IP transmission channel between the external interface and a server;

obtaining, by the processor, hard disk firmware from the external interface, where the hard disk firmware is received by the external interface from the server through the IP transmission channel; and suspending, by the processor, the hard disk, and loading the hard disk firmware to a memory.

In a first possible implementation manner of the first aspect, the method further includes:

obtaining, by the processor, an operating system OS image from the external interface, where the OS image is received by the external interface from the server through the IP transmission channel; and loading, by the processor, the OS image to the memory, and starting and running the loaded OS image.

With reference to the first aspect or the first possible implementation manner of the first aspect, in a second possible implementation manner, the method further includes:

obtaining, by the processor, hard disk service processing software from the external interface, where the hard disk service processing software is received by the external interface from the server through the IP transmission channel; and stopping, by the processor, a process of original hard disk service processing software, loading the hard disk service processing software to the memory, and then starting a process of the loaded hard disk service processing software.

A second aspect provides a storage system, where the storage system includes an external interface, a processor, a non-volatile storage medium, a hard disk controller, and a hard disk;

the external interface is configured to receive a control signal and service data that are outside the storage system;

the processor is configured to obtain the service data from the external interface and control the hard disk controller to store the service data into the hard disk; and specifically, the processor is configured to start a Boot Loader recorded in the non-volatile storage medium, configure an IP address for the storage system after the loader is started, then establish, based on the IP address, an IP transmission channel between the external interface and a server, obtain hard disk firmware from the external interface, suspend the hard disk, and load the hard disk firmware to a memory, where the hard disk firmware is received by the external interface from the server through the IP transmission channel.

In a first possible implementation manner of the second aspect, the processor is further configured to obtain an operating system OS image from the external interface, load the OS image to the memory, and start and run the loaded OS image, where the OS image is received by the external interface from the server through the IP transmission channel.

With reference to the second aspect or the first possible implementation manner of the second aspect, in a second possible implementation manner, the processor is further configured to obtain hard disk service processing software from the external interface, stop a process of original hard disk service processing software, load the hard disk service processing software to the memory, and then start a process of the loaded hard disk service processing software, where the hard disk service processing software is received by the external interface from the server through the IP transmission channel.

A third aspect provides a processor, applied to a storage system, where the storage system includes an external interface, a processor, a non-volatile storage medium, a hard disk controller, and a hard disk, where the external interface is configured to receive a control signal and service data that are outside the storage system, the processor is configured to obtain the service data from the external interface and control the hard disk controller to store the service data into the hard disk, and the processor specifically includes:

a transmission channel establishing unit, configured to start a Boot Loader recorded in the non-volatile storage medium, configure an IP address for the storage system after the loader is started, and then establish, based on the IP address, an IP transmission channel between the external interface and a server;

an information obtaining unit, configured to obtain hard disk firmware from the external interface, where the hard disk firmware is received by the external interface from the server through the IP transmission channel; and a processing unit, configured to suspend the hard disk, and load the hard disk firmware to a memory.

In a first possible implementation manner of the third aspect, the information obtaining unit is further configured to obtain an operating system OS image from the external interface; and the processing unit is further configured to load the OS image to the memory, and start and run the loaded OS image, where the OS image is received by the external interface from the server through the IP transmission channel.

With reference to the third aspect or the first possible implementation manner of the third aspect, in a second possible implementation manner, the information obtaining unit is further configured to obtain hard disk service processing software from the external interface; and the processing unit is further configured to stop a process of original hard disk service processing software, load the hard disk service processing software to the memory, and then start a process of the loaded hard disk service processing software, where the hard disk service processing software is received by the external interface from the server through the IP transmission channel.

With reference to the third aspect, or the first possible implementation manner of the third aspect, or the second possible implementation manner of the third aspect, in a third possible implementation manner, the external interface includes:

an interface that is directly disposed externally on the hard disk or an externally disposed interface that is provided by an external control part connected to the hard disk.

With reference to the third aspect, or the first possible implementation manner of the third aspect, or the second possible implementation manner of the third aspect, or the third possible implementation manner of the third aspect, in a fourth possible implementation manner, the external control part includes a system on chip or a riser card.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner, the external interface includes an Ethernet network interface, a PCI Express interface, a USB interface, and/or an Infiniband interface.

Compared with the prior art, the embodiments of the present invention have the following beneficial effects: A set external interface receives a control signal and service data that are outside a storage system, and a set processor obtains the service data from the external interface and controls a hard disk controller to store the service data into a hard disk, so that a dynamic and timely update or upgrade of the hard disk is implemented to enhance flexibility and compatibility of processing of the hard disk, thereby meeting constantly changing requirements of software and hardware environments.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

In the following description, to illustrate rather than limit, specific details such as a particular system structure, an interface, and a technology are provided to make a thorough understanding of embodiments of the present invention. However, it should be understood by persons skilled in the art that the present invention can also be implemented in other embodiments without the specific details. In other cases, detailed descriptions of well known apparatuses, circuits and methods are omitted, so that the present invention is described without being disturbed by the unnecessary details.

The terms "system" and "network" may be used interchangeably in the embodiments of the present invention. The term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in the embodiments of the present invention generally indicates an "or" relationship between the associated objects.

Figure 1:
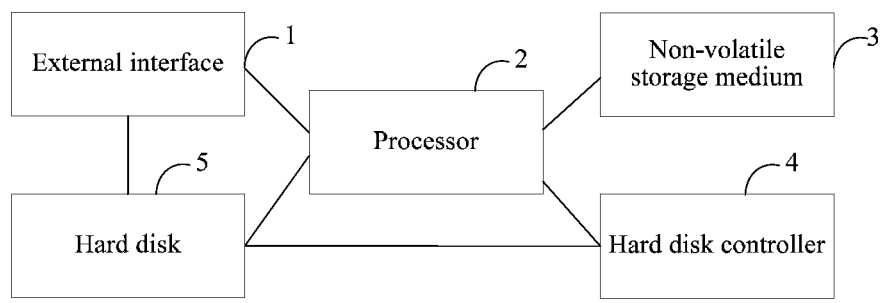
FIG. 1 is a structural composition diagram of a storage system to which a hard disk system operation method is applicable according to an embodiment of the present invention.

FIG. 1 shows a structural composition of a storage system to which a method for implementing an intelligent hard disk is applicable according to an embodiment of the present invention. For the ease of description, only parts related to this embodiment are shown.

The storage system is a cloud computing system focusing on data storage and management. As shown in FIG. 1, the storage system includes an external interface 1, a processor 2, a non-volatile storage medium 3, a hard disk controller 4, and a hard disk 5. The external interface 1 is configured to receive a control signal and service data that are outside the storage system, and the processor 2 is configured to obtain the service data from the external interface 1 and control the hard disk controller 4 to store the service data into the hard disk 5.

Specifically, the processor 2 is configured to start a Boot Loader recorded in the non-volatile storage medium 3, configure an IP address for the storage system after the loader is started, then establish, based on the IP address, an IP transmission channel between the external interface 1 and a server, obtain hard disk firmware from the external interface 1, suspend the hard disk 5, and load the hard disk firmware to a memory, where the hard disk firmware is received by the external interface 1 from the server through the IP transmission channel.

Further, the processor 2 is further configured to obtain an operating system OS image from the external interface 1, load the OS image to the memory, and start and run the loaded OS image, where the OS image is received by the external interface from the server through the IP transmission channel.

Further, the processor 2 is further configured to obtain hard disk service processing software from the external interface 1, stop a process of original hard disk service processing software, load the hard disk service processing software to the memory, and then start a process of the loaded hard disk service processing software, where the hard disk service processing software is received by the external interface 1 from the server through the IP transmission channel.

In this embodiment, the external interface 1 includes an Ethernet network interface, a Peripheral Component Interconnect PCI Express interface, a USB interface and/or an Infiniband interface, or the like.

In this embodiment, the processor is added to a conventional hard disk, so that the conventional hard disk becomes an intelligent hard disk, forms one miniature storage node in the storage system, and has a smaller faulty-area granularity (a single hard disk), which enhances overall reliability of the storage system. It should be noted that, in the prior art, dozens of hard disks are generally controlled and managed by using a single processor (for example, an Intel X86 processor); when a fault occurs in the processor, dozens of trillions of bytes or even one hundred trillion of bytes of data may become invalid, resulting in a large data migration and fault recovery granularity, and greatly affecting services. Moreover, because the processor is built in the hard disk, overall space occupied by the storage system can be reduced, an integration level can be increased, and overall energy consumption of the storage system can be decreased.

In addition, exchange of a control message is performed with the server by using the external interface, a transmission channel is established, the hard disk firmware, the OS image and/or the hard disk service processing software that is transmitted by the server through the transmission channel is received, and the received hard disk firmware, OS image and/or hard disk service processing software is written into a non-volatile storage unit by the processor, so that initial installation and a dynamic and timely update or upgrade of the hard disk can be implemented to enhance flexibility and compatibility of intelligent processing of the hard disk, thereby meeting requirements of various new services.

An application scenario provided by this embodiment is only used to explain the present invention, and does not limit the protection scope of the present invention.

Figure 2:
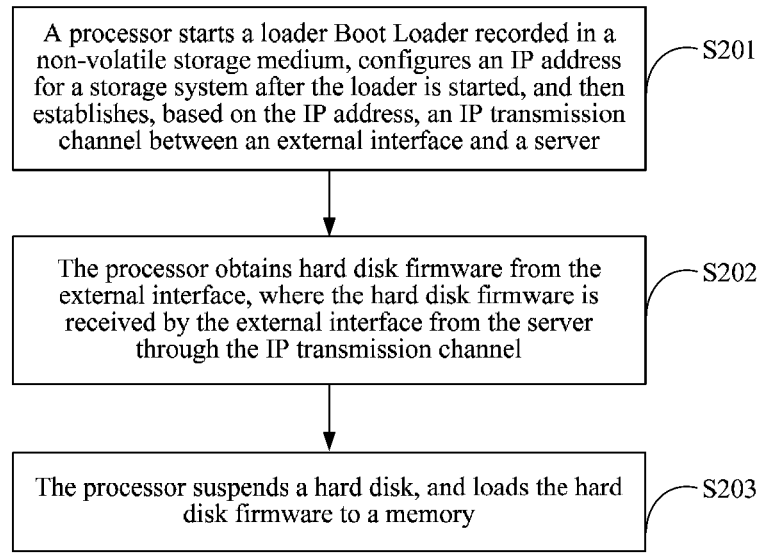
FIG. 2 is an implementation flowchart of a hard disk system operation method according to an embodiment of the present invention.

FIG. 2 shows a procedure for implementing a hard disk system operation method according to another embodiment of the present invention. The hard disk system operation method according to this embodiment may be applied to the storage system shown in FIG. 1. A process of the method is described in detail as follows:

In step S201, a processor starts a Boot Loader recorded in a non-volatile storage medium, configures an IP address for the storage system after the loader is started, and then establishes, based on the IP address, an IP transmission channel between an external interface and a server.

Figure 3:
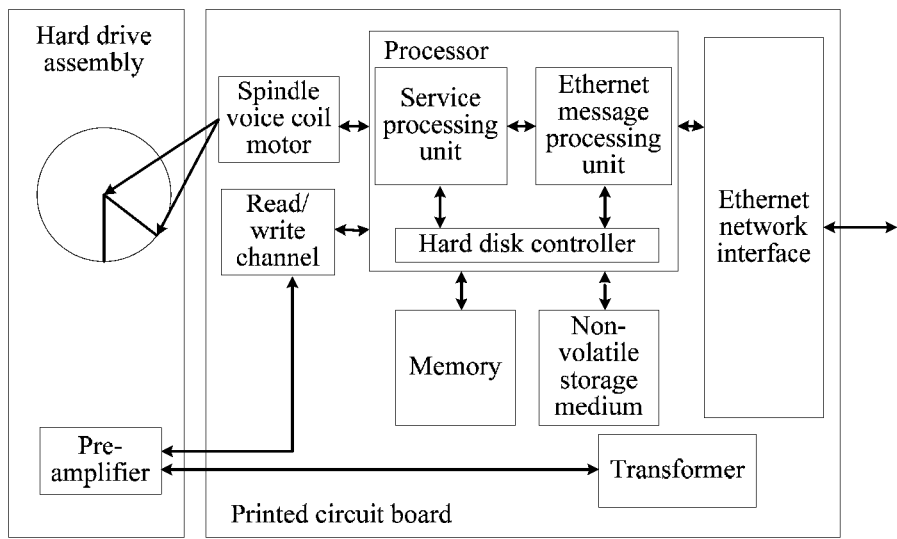
FIG. 3 is a schematic diagram of an external interface according to an embodiment of the present invention.
Figure 4:
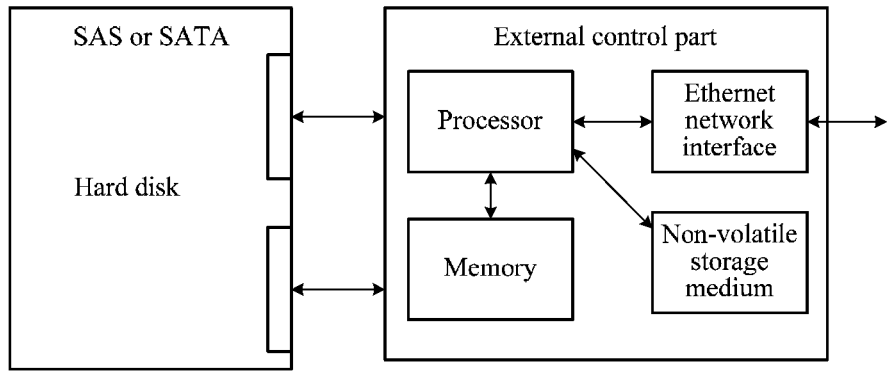
FIG. 4 is a schematic diagram of another external interface according to an embodiment of the present invention.

Exemplarily, the external interface includes an interface (as shown in FIG. 3) that is directly disposed externally on a hard disk or an externally disposed interface (as shown in FIG. 4) that is provided by an external control part connected to a hard disk.

For the interface that is directly disposed externally on a hard disk, as shown in FIG. 3, a box on the left is a hard disk body, including a hard drive assembly (Hard Drive Assembly, HDA) and a pre-amplifier (Preamp). A box on the right is a printed circuit board (Printed Circuit Board, PCB), including a spindle voice coil motor (Spindle Voice Coil Motor, Spindle VCM), a read/write channel (Read/Write Channel), a memory, a non-volatile storage medium (for example, an electrically programmable read-only-memory (Electrically Programmable Read-Only-Memory, EPROM)), a transformer (Transformer), a built-in processor, and an externally disposed interface. Exemplarily, the externally disposed interface is an Ethernet network interface (Ethernet Network Interface), and protocols carried on the Ethernet network interface may include the Internet Small Computer System Interface iSCSI protocol, the Advanced Technology Attachment ATA protocol, the Small Computer System Interface SCSI protocol, the Transmission Control Protocol and/or Internet Protocol TCP and/or IP, the Key-Value Key-Value protocol, and the Hypertext Transfer Protocol HTTP. The processor further includes a service processing unit (Service Processing), an Ethernet message processing unit, and a hard disk controller (Hard Disk Controller).

The hard disk controller in the processor is separately connected to the spindle VCM and the read/write channel, the read/write channel is connected to the preamp, the preamp is connected to the transformer, and the processor is separately connected to the externally disposed interface, and the spindle voice coil motor, the read/write channel, the non-volatile storage medium, and the memory in the hard disk.

In this embodiment, the read/write channel performs read/write of magnetic disk data by using a read/write head, the memory provides storage space for hard disk control, Ethernet message processing, and service processing, the ROM is configured to store hard disk firmware (Firmware), the transformer provides power conversion, and the Ethernet Network Interface provides the Ethernet network interface externally. The built-in processor (Controller Unit) is configured to provide at least one of the following functions: hard disk control, Ethernet message processing, and service processing. Specifically, the Ethernet message processing unit is configured to process a message received or sent by the Ethernet network interface, the service processing unit is configured to perform semantic processing on the received message and perform semantic conversion on a response message and a notification message of the hard disk, and the hard disk controller is configured to control a hard disk operation according to protocols of a received or sent message. It should be noted that, the foregoing hard disk control, Ethernet message processing, and service processing functions may be separately deployed by using different hardware (for example, an Ethernet message processor, a service processor, and the like are added), or may be integrated into a same system on chip (System On Chip, SoC), micro controller unit (Micro Controller Unit, MCU), or digital signal processor (Digital Signal Processor, DSP). In addition, the needed Firmware may be stored in the ROM in advance, or may be directly loaded by using the Ethernet network interface.

For the externally disposed interface that is provided by an external control part connected to a hard disk, as shown in FIG. 4, a box on the left is a hard disk (an SAS hard disk or an SATA hard disk), and a box on the right is an external control part, where the external control part includes but is not limited to a system on chip or a riser card. The external control part includes a processor, an externally disposed interface (for example, an Ethernet network interface), a memory, and a non-volatile storage medium (for example, an EPROM). The processor is separately connected to the memory, the Ethernet network interface, and the EPROM. The processor is configured to process hard disk interface protocols, and parse, assemble, and process an Ethernet network interface message; the ROM is configured to store hard disk firmware (Firmware); a message processed on the Ethernet network interface includes but is not limited to a message that is based on a protocol such as the iSCSI, the ATA, the SCSI, the TCP/IP, the key-value Key-Value, or the HTTP.

It should be noted that, an Ethernet network interface is used as an example of the foregoing externally disposed interface, and a person of ordinary skill in the art should understand that, other externally disposed interfaces such as a PCI Express interface, a USB interface, and an Infiniband interface are also applicable to this embodiment.

In step S202, the processor obtains hard disk firmware from the external interface, where the hard disk firmware is received by the external interface from the server through the IP transmission channel.

In step S203, the processor suspends a hard disk, and loads the hard disk firmware to a memory.

Further, this embodiment may further include:

obtaining, by the processor, an operating system OS image from the external interface, where the OS image is received by the external interface from the server through the IP transmission channel; and loading, by the processor, the OS image to the memory, and starting and running the loaded OS image.

Further, this embodiment may further include:

obtaining, by the processor, hard disk service processing software from the external interface, where the hard disk service processing software is received by the external interface from the server through the IP transmission channel; and stopping, by the processor, a process of original hard disk service processing software, loading the hard disk service processing software to the memory, and then starting a process of the loaded hard disk service processing software.

In this embodiment, downloading the hard disk firmware, the OS image and/or the hard disk service processing software from the server by using the external interface specifically includes:

when the loader Bootloader is stored in a non-volatile storage unit of the hard disk, skipping powering on the hard disk, starting the Bootloader by using the processor, configuring an IP address, and after the IP address is configured, performing exchange of a control message with the server by using the external interface and establishing a transmission channel;

receiving the hard disk firmware, the OS image and/or the hard disk service processing software that is transmitted by the deployment server through the transmission channel; and determining whether the received hard disk firmware, OS image and/or hard disk service processing software is information about a required version, and if yes, loading the hard disk firmware, the OS image and/or the hard disk service processing software, to implement initial installation, update, or upgrade of the hard disk.

In this embodiment, the hard disk with the external interface is connected to the server by using a network, performs the exchange of the control message with the server, and establishes a firmware transmission channel, where, a channel of the exchange of the control message and the firmware transmission channel may be a same channel or different channels. The control message may be control information carried in a manner of an Internet Small Computer System Interface iSCSI or a serial attached Small Computer System Interface SAS, or Advanced Technology Attachment ATA control information carried by using a Serial Advanced Technology Attachment SATA interface, and includes but is not limited to a message such as Write Buffer or Switch Page in Small Computer System Interface enclosure services (SCSI Enclosure Services, SES). The control message may also be control information customized by a user, and includes a message such as a firmware update or upgrade request, WriteFirmware (WriteFirmware), CheckFirmware (CheckFirmware), or NotifyFirmware (NotifyFirmware).

It should be noted that, when running, the processor needs a Boot Loader, boot parameters (Boot Parameters), a kernel (kernel), and a root file system (Root FileSystem), where a main task of the Boot Loader is to read the kernel (an operating system image) from a storage medium into the memory, and then jump to an entry point of the kernel to run, so as to start an operating system. The root file system includes a device file, a configuration file, a runtime library, and the like, which are necessary.

Manners in which the processor is started to run are divided into three types: start by using a non-volatile storage medium (for example, load and start by means of an EPROM, a NAND Flash or a NOR Flash), start by using a network (the start by using a network is supported by using PXE of BIOS or UBoot, and generally in this case the Bootloader has been loaded to the controller), and start by using a hard disk (the Bootloader needs to be loaded first by using a non-volatile storage unit, then a hard disk drive is loaded, and the operating system is booted from the hard disk).

In this embodiment, when the externally disposed interface is an interface that is externally disposed directly on the hard disk, specific manners of loading the hard disk firmware, the OS image and/or the hard disk service processing software include but are not limited to the following three manners:

Manner 1: Only the Bootloader is stored in the non-volatile storage unit (for example, a NOR Flash), and in this case the hard disk is not powered on. When being reset, the built-in processor is started from a fixed address of the non-volatile storage medium, and the processor starts the Bootloader in the non-volatile storage medium. Then, the processor configures an IP address by using the Dynamic Host Configuration Protocol (Dynamic Host Configuration Protocol, DHCP) or in another manner; and after the IP address is configured, downloads the hard disk firmware, the OS image and/or the hard disk service processing software (including a memory image, a hard disk drive, a root file system, a service running software package, and the like) from the server, where a downloading manner may conform to a protocol such as the TFTP or the NFS.

In a process in which the hard disk runs, when the hard disk firmware, the OS image and/or the hard disk service processing software needs to be updated or upgraded, the hard disk determines whether the received hard disk firmware, the OS image and/or the hard disk service processing software is the information about the required version; and if yes, loads the hard disk firmware, the OS image and/or the hard disk service processing software; or if no, downloads the information about the required version from the server, and performs loading after the downloading.

Specifically, when the hard disk firmware needs to be updated, the hard disk is powered off and suspended first, hard disk firmware of the required version is loaded to the memory, and then the hard disk is powered on, the hard disk is driven, and a read/write operation is performed on the hard disk; when the OS image needs to be updated, an operating system image file of the required version is loaded to the memory, and an operating system image of the required version is started and run; when the hard disk service processing software needs to be updated, the process of the original hard disk service processing software is stopped, new hard disk service processing software (that is, hard disk service processing software of the required version) is loaded to the memory, and then a process of the new hard disk service processing software is started.

Optionally, in this embodiment, after the hard disk firmware, the OS image and/or the hard disk service processing software is downloaded from the server, the hard disk firmware, the OS image and/or the hard disk service processing software may be written into the non-volatile storage unit first; and then, when an update or upgrade is needed, the hard disk firmware, the OS image and/or the hard disk service processing software is loaded from the non-volatile storage unit to the memory of the hard disk to run.

Manner 2: When a system is started, the Boot Loader, the hard disk firmware, the operating system image, the hard disk service processing software, and the like are stored in the non-volatile storage unit (for example, a NOR Flash). In this case, the built-in processor starts the Boot Loader from the non-volatile storage medium, and loads the hard disk firmware from the non-volatile storage medium, to drive the hard disk, where the hard disk Firmware, the operating system image, the hard disk service processing software, and the like may be stored in the non-volatile storage medium in advance, may be obtained from the server by using the external interface (which is the same as that in Manner 1), or may be installed on the hard disk in advance, and after the hard disk drive is loaded, the operating system is booted from the hard disk.

Manner 3: When the Bootloader and the hard disk firmware are stored in the non-volatile storage medium of the hard disk and the OS image and several pieces of hard disk service processing software are initially installed on the hard disk, the Bootloader is started by using the processor, and the hard disk firmware is loaded from the non-volatile storage unit, to drive the hard disk and read the installed OS image for loading. The hard disk service processing software may be selected from the several pieces of installed hard disk service processing software, or downloaded from the server by using the externally disposed interface (which is the same as that in Manner 1), or may be installed on the hard disk in advance, and after the hard disk drive is loaded, the operating system is booted from the hard disk.

When the manner of disposing the externally disposed interface is that the external control part is connected outside the hard disk, loading the hard disk firmware and hard disk service processing software specifically includes:

(1) Update or upgrade of the hard disk Firmware: The processor of the external control part downloads new hard disk Firmware information from the server by using the externally disposed interface; writes the downloaded new hard disk firmware information into the non-volatile storage medium of the external control part; when the hard disk firmware needs to be updated, determines whether the hard disk firmware information stored in the non-volatile storage medium of the external control part is the information about the required version; and if yes, powers off and suspends the hard disk first, then loads the hard disk Firmware from the non-volatile storage medium of the external control part, and powers on the hard disk after an upgrade performed by using a conventional hard disk Firmware upgrade interface. Then, a read/write operation can be performed on the hard disk.

(2) Update or upgrade of the hard disk firmware, the OS image, and/or the hard disk service processing software: The Bootloader, the hard disk firmware, the OS image, the hard disk service processing software, and the like are stored in the non-volatile storage medium (for example, a NOR Flash). In this case, the built-in processor starts the Boot Loader from the non-volatile storage medium, and loads the hard disk firmware, to drive the hard disk, where the hard disk Firmware, the operating system image, the hard disk service processing software, and the like may be stored in the non-volatile storage medium in advance, may be obtained from the server by using the externally disposed interface, or may be installed on the hard disk in advance, and after the hard disk drive is loaded, the operating system is booted from the hard disk.

It should be noted that, a conventional hard disk interface is a connection part between the hard disk and a host system, and is only configured to transmit data between a hard disk memory and a host memory. The conventional hard disk interface cannot be connected to the network to implement the update or upgrade of the hard disk. However, in this embodiment, by using the external interface, the hard disk can be conveniently connected to the network, to implement the initial installation and dynamic and timely update or upgrade of the hard disk.

Figure 5:
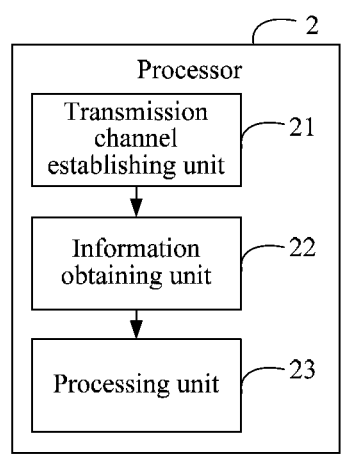
FIG. 5 is a structural composition diagram of a processor according to an embodiment of the present invention.

FIG. 5 shows structural composition of a processor according to another embodiment of the present invention. For the ease of description, only parts related to this embodiment of the present invention are shown.

The processor 2 may be applied to the storage system shown in FIG. 1.

The processor 2 specifically includes a transmission channel establishing unit 21, an information obtaining unit 22, and a processing unit 23, where, specific functions of the units are as follows:

the transmission channel establishing unit 21 is configured to start a Boot Loader recorded in a non-volatile storage medium, configure an IP address for the storage system after the loader is started, and then establish, based on the IP address, an IP transmission channel between an external interface and a server;

the information obtaining unit 22 is configured to obtain hard disk firmware from the external interface, where the hard disk firmware is received by the external interface from the server through the IP transmission channel; and the processing unit 23 is configured to suspend a hard disk, and load the hard disk firmware to a memory.

Further, the information obtaining unit 22 is further configured to obtain an operating system OS image from the external interface; and the processing unit 23 is further configured to load the OS image to the memory, and start and run the loaded OS image, where the OS image is received by the external interface from the server through the IP transmission channel.

Further, the information obtaining unit 22 is further configured to obtain hard disk service processing software from the external interface; and the processing unit 23 is further configured to stop a process of original hard disk service processing software, load the hard disk service processing software to the memory, and then start a process of the loaded hard disk service processing software, where the hard disk service processing software is received by the external interface from the server through the IP transmission channel.

In this embodiment, the external interface includes an interface that is directly disposed externally on the hard disk, an externally disposed interface that is provided by an external control part connected to the hard disk, or the like. The external control part includes a system on chip, a riser card, or the like. The external interface includes an Ethernet network interface, a PCI Express interface, a USB interface and/or an Infiniband interface, or the like.

For specific working processes of the units in the processor in this embodiment, reference may be made to corresponding processes in the foregoing method embodiments, and details are not provided herein again.

In summary, in the embodiments of the present invention, a set external interface receives a control signal and service data that are outside a storage system, and a set processor obtains the service data from the external interface and controls a hard disk controller to store the service data into a hard disk, so that a dynamic and timely update or upgrade of the hard disk is implemented to enhance flexibility and compatibility of processing of the hard disk, thereby meeting constantly changing requirements of software and hardware environments. Moreover, the processor is added to a conventional hard disk, so that the hard disk becomes an intelligent hard disk, forms one miniature storage node in the storage system, and has a smaller faulty-area granularity (a single hard disk), which enhances overall reliability of the storage system. In addition, because the processor is built in the hard disk, overall space occupied by the storage system can be reduced, an integration level can be increased, and overall energy consumption of the storage system can be decreased.

It may be clearly understood by persons skilled in the art that, for the purpose of convenient and brief description, division of the foregoing functional units is used as an example for illustration. In an actual application, the foregoing functions can be allocated to different functional units and implemented according to a requirement, that is, an inner structure of an apparatus is divided into different functional units to implement all or a part of the functions described above. In addition, specific names of the functional units are merely provided for the purpose of distinguishing the units from one another, but are not intended to limit the protection scope of the present invention. For specific working processes of the system, processor, and unit that are described above, reference may be made to corresponding processes in the foregoing method embodiments, and details are not provided herein again.

In the several embodiments of the present invention, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, the functional units in the embodiments of the present invention may be integrated into one controller, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method applied to a hard disk system comprising (a) a hard disk body housing a hard disk drive, (b) a printed circuit board (PCB) that is separate from the hard disk body and supports an external interface, a processor, a non-volatile storage medium, and a memory, and (c) a hard disk interface between the hard disk drive and the PCB of the hard disk system, wherein
   a) the processor is coupled to the hard disk drive by way of the hard disk interface, the external interface, the non-volatile storage medium and the memory,
   b) the external interface is configured to receive a control signal and service data from a network external to a host system of the hard disk drive,
   c) the processor is configured to obtain the service data from a server within the network via the external interface and store the service data in the hard disk drive, and
   d) the hard disk interface is configured to only transmit data to and from the hard disk drive within a host system of the hard disk drive that is not in communication with the network,
the method comprises:
   starting, by the processor, a boot loader recorded in the non-volatile storage medium;
   configuring, by the processor, an IP address for the hard disk drive after starting the boot loader;

upon configuring the IP address, establishing, by the processor and based on the IP address, an IP transmission channel between the external interface and the server;

receiving, by the processor and via the external interface, the control signal from the server, wherein the control signal carries control information including one or more of:
i. an internet small computer system interface (iSCSI),
ii. a serial attached small computer system interface (SAS), and
iii. an advanced technology attachment (ATA) carried in a manner of a serial advanced technology attachment (SATA) interface;

receiving, by the processor via the external interface, the service data from outside the hard disk body;

obtaining, by the processor, hard disk service processing software from the external interface, wherein the obtained hard disk service processing software is received by the external interface from the server through the IP transmission channel;

determining, by the processor, whether the obtained hard disk service processing software is a required version;

once the processor determines the obtained hard disk service processing software is the required version, suspending, by the processor, a process being run by an original hard disk service processing software, and loading the obtained hard disk service processing software to the memory so as to dynamically update the hard disk drive with the obtained hard disk service processing software; and starting, by the processor, a process of running the obtained hard disk service processing software upon loading the obtained hard disk service processing software.

2. The method according to claim 1, further comprising:
obtaining, by the processor, an operating system (OS) image from the external interface, wherein the OS image is received by the external interface from the server through the IP transmission channel;
loading, by the processor, the OS image to the memory; and
running, by the processor, the loaded OS image.

3. The method according to claim 1, wherein the hard disk body includes a hard drive assembly and a pre-amplifier.

4. The method according to claim 1, after loading the hard disk firmware to the memory, the method further comprising booting an operating system from the hard disk.

5. A hard disk system comprising (a) a hard disk body housing a hard disk drive, (b) a printed circuit board (PCB) that is separate from the hard disk body and supports an external interface, a processor, a non-volatile storage medium, and a memory and (c) a hard disk interface between the hard disk drive and the PCB of the hard disk system,
wherein the processor is coupled to the hard disk drive by way of the hard disk interface, the external interface, the non-volatile storage medium and the memory,
wherein the hard disk interface is configured to only transmit data to and from the hard disk drive within a host system of the hard disk drive that is not in communication with an external network, and
wherein the external interface is configured to receive a control signal and service data from the external network; and the processor is configured to
(a) obtain the service data from a server within the network via the external interface,
(b) store the service data into the hard disk body,
(c) start a boot loader recorded in the non-volatile storage medium,
(d) configure an IP address for the storage after the loader is started,
(e) upon configuring the IP address, establish, based on the IP address, an IP transmission channel between the external interface and the server within the network,
(f) receive, via the external interface, the control signal from the server, wherein the control signal carries control information including one or more of: an internet small computer system interface (iSCSI), a serial attached small computer system interface (SAS), and an advanced technology attachment (ATA) carried in a manner of a serial advanced technology (SATA) interface;
(g) receive, via the external interface, the service data from outside the host system of the hard disk body;
(h) obtain hard disk service processing software from the external interface,
(i) determine whether the obtained hard disk service processing software is a required version,
(j) once the processor determines the obtained hard disk service processing software is the required version, suspend a process being run by an original hard disk service processing software, and load the obtained hard disk service processing software to the memory so as to dynamically update the hard disk with the obtained hard disk service processing software,
wherein the obtained hard disk service processing software is received by the external interface from the server through the IP transmission channel, and
(k) start a process of running the obtained hard disk service processing software upon loading the obtained hard disk service processing software.

6. The hard disk system according to claim 5, wherein the processor is further configured to:
obtain an operating system (OS) image from the external interface;
load the OS image to the memory; and
start and run the OS image, wherein the OS image is received by the external interface from the server through the IP transmission channel.

7. The hard disk system according to claim 5, wherein the hard disk drive comprises a hard drive assembly and a pre-amplifier.

8. The hard disk system according to claim 5, wherein the PCB connected to the hard disk body supports a spindle voice coil motor, a read/write channel and a transformer.

9. The hard disk according to claim 5, wherein the processor is further configured to boot an operating system from the hard disk after the hard disk firmware is loaded to the memory.

10. A hard disk system comprising (a) a hard disk body housing a hard disk drive, (b) a printed circuit board (PCB) that is separate from the hard disk body and supports an external interface, a processor, a non-volatile storage medium, and a memory and (c) a hard disk interface between the hard disk drive and the PCB of the hard disk system,
wherein the processor is coupled to the hard disk drive by way of the hard disk interface, the external interface, the non-volatile storage medium, a spindle voice coil motor, wherein the spindle voice coil motor is coupled to the hard disk drive of the hard drive body, a read/write channel and the memory, wherein the hard disk interface is configured to only transmit data to and from the hard disk drive within a host system of the hard disk drive that is not in communication with the network, and wherein the external interface is configured to receive a control signal and service data from a network external to the host system; and the processor is configured to
- (a) obtain the service data from a server within the network via the external interface,
- (b) store the service data into the hard disk body,
- (c) start a boot loader recorded in the non-volatile storage medium,
- (d) configure an IP address for the storage after the loader is started,
- (e) upon configuring the IP address, establish, based on the IP address, an IP transmission channel between the external interface and the server within the network,
- (f) receive, via the external interface, the control signal from the server, wherein the control signal carries control information including one or more of: an internet small computer system interface (iSCSI), a serial attached small computer system interface (SAS), and an advanced technology attachment (ATA) carried in a manner of a serial advanced technology (SATA) interface,
- (g) receive, via the external interface, the service data from outside the hard disk body,
- (h) obtain hard disk service processing software from the external interface,
- (i) determine whether the obtained hard disk service processing software is a required version,
- (j) once the processor determines the obtained hard disk service processing software is the required version, suspend a process being run by an original the hard disk service processing software, and load the obtained hard disk service processing software to the memory so as to dynamically update the hard disk with the obtained hard disk service processing software, wherein the obtained hard disk service processing software is received by the external interface from the server through the IP transmission channel, and
- (k) start a process of running the obtained hard disk service processing software upon loading the obtained hard disk service processing software.

11. The hard disk system according to claim 10, wherein the processor is further configured to boot an operating system from the hard disk.

12. The hard disk system according to claim 10, wherein the processor is further configured to:
obtain an operating system (OS) image from the external interface;
load the OS image to the memory; and
start and run the OS image, wherein the OS image is received by the external interface from the server through the IP transmission channel.

13. The hard disk system according to claim 10, wherein the hard disk drive comprises a hard drive assembly and a pre-amplifier.

14. The hard disk system according to claim 10, wherein the PCB connected to the hard disk body supports the spindle voice coil motor, the read/write channel and a transformer.

* * * * *